Figure 3:
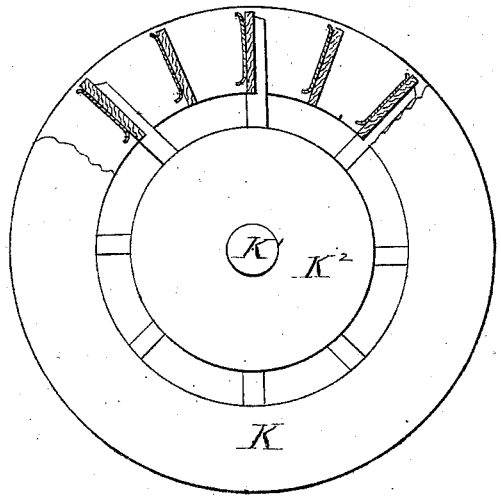

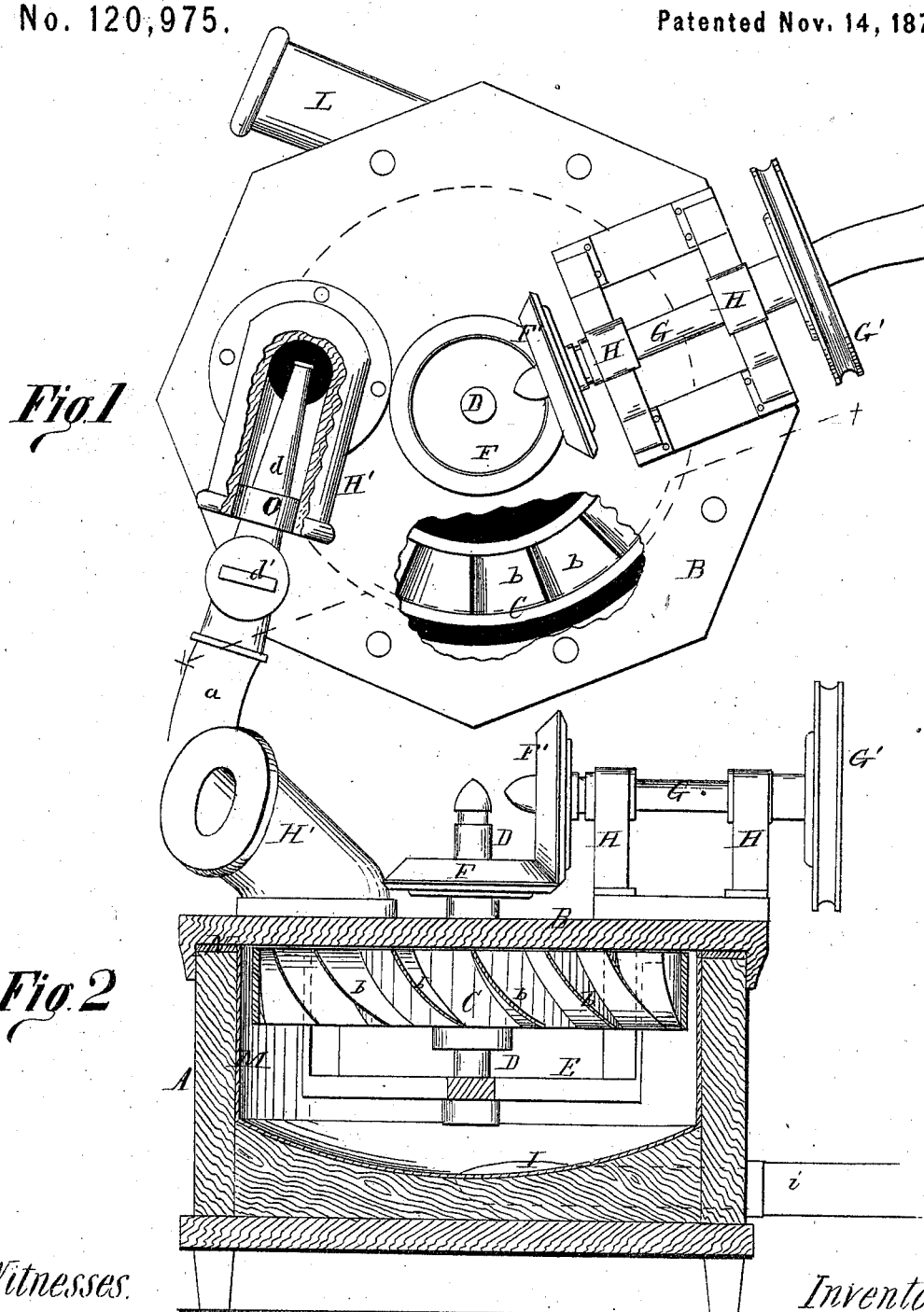

2 Sheets--Sheet 2.

J. H. JENNINGS.

Hydraulic Motion for Sewing Machines.

No. 120,975.

Patented Nov. 14, 1871.

Witnesses

Inventor

UNITED STATES PATENT OFFICE.

JOHN HENRY JENNINGS, OF NEW BEDFORD, MASSACHUSETTS.

IMPROVEMENT IN HYDRAULIC MOTORS.

Specification forming part of Letters Patent No. 120,975, dated November 14, 1871.

*To all whom it may concern:*

Be it known that I, JOHN HENRY JENNINGS, of New Bedford, in the county of Bristol and State of Massachusetts, have invented a new and valuable Improvement in Sewing-Machine Motors; and I do hereby declare that the following is a full, clear, and exact description of the construction and operation of the same, reference being had to the annexed drawing making a part of this specification, and to the letters and figures of reference marked thereon.

Figure 1 of the drawing is a plan view of my invention. Fig. 2 is a vertical section on line $x$ $x$, Fig. 1. Fig. 3 is a view of undershot wheel.

This invention has relation to sewing-machine motors; and consists in the construction of an apparatus, as hereinafter described, for utilizing water-power in propelling sewing-machines.

Referring to the accompanying drawing illustrating this invention, A represents a casing having a cylindrical interior space, and provided with a closely-fitting cover, B. C represents a turbine water-wheel of limited dimensions secured to the lower part of a vertical shaft, D, which passes through the cover B and has its lower bearing in the center of the bracket E. F represents a beveled friction or gear wheel secured to the shaft D above the cover B, and adapted to work in connection with a corresponding wheel, F', which is secured to the end of a horizontal shaft, G, having its bearings on the standard H, as shown in the drawing.

When friction-wheels are used in this relation they should be covered with leather or other elastic material, so as to permit of close impingement, and consequently allow of the transmission of considerable power from the turbine wheel to the sewing-machine.

G' represents a pulley-wheel on the outer end of shaft G.

Water is conveyed to the turbine wheel from an ordinary hydrant or any suitable reservoir by means of a hose, $a$, which is made to throw the stream directly on the faces of the buckets $b$. The hose should be furnished with a tapering nozzle, $d$, provided with a regulating-valve or cock, $d'$. The water being forced through this nozzle is diminished in the diameter of stream and its force consequently increased. Hence, where the head of water is of sufficient capacity, increased force may be combined with volume, and the speed as well as the working power of the wheel improved.

In the drawing, H' indicates an inclined pipe communicating with the interior of the casing A, and arranged in such oblique relation to the radius of the wheel that water passing through it shall strike directly on and against the concave faces of the wheel-buckets. The nozzle $d$ of the hose is inserted into said pipe in order to conduct the stream in a direct line. I designates an outlet in the bottom of the case A communicating with a section of hose or pipe, $i$, and designed as a conduit for the exhaust water. In Fig. 3 of the drawing is shown an undershot or paddle-wheel, K, which may be substituted sometimes for the turbine. It is attached to a shaft, $K^1$, and is designed to revolve in a vertical plane, the shaft $K^1$ being arranged in a horizontal position. This wheel is inserted in the case A, which is turned on its side and receives the force of water at right angles to the radial position of the paddles, through the medium of a pipe, L, the hose and nozzle being used as already described. On the shaft $K^1$ of the wheel K is fixed a pulley-wheel, $K^2$. A balance-wheel should also be attached. The latter may be provided by securing the turbine to the shaft $K^1$ and using it as a balance.

Although the wheel K is designed to be run particularly as an undershot wheel—that is, revolving on a horizontal axis—yet it may be used in the same manner generally as a turbine by arranging it in a similar position and employing bevel-wheels or equivalent contrivances for giving the pulley-wheel the proper direction of rotation.

The sewing-machine is connected to the motor by means of an endless band running from the fly-wheel or pulley on the driving-shaft to either of the pulley-wheels G' or $K^2$.

M represents a lining, of zinc or galvanized metal, to the case A. N is an India-rubber packing between the cover and walls to prevent leakage. O designates an India-rubber collar encircling the nozzle $d$ and fitting the pipe H' closely. It is obviously designed to produce a tight seam and prevent waste. $h$ represents the buckets of the wheel K, which are constructed with their inner and outer edges bent or flanged so as to better adapt them to receive the force of the water.

It will be observed that the inner curve of flange is the longest. Its purpose is to throw the force of the stream outward, so as to utilize all the power contained in the water. The spaces between the buckets are left open so that the wheel may relieve itself of all surplus water as speedily as possible.

What I claim as my invention, and desire to secure by Letters Patent, is—

The improved motor, consisting of the wheel C with buckets $b$ and shaft D, and the exterior case A having adaptations for the application of water above, as through the pipe H', and beneath, as through the pipe L, substantially as shown and specified.

In testimony that I claim the above I have hereunto subscribed my name in the presence of two witnesses.

JOHN HENRY JENNINGS.

Witnesses:
    D. W. HOWLAND,
    ROBERT BLACK.

(168)